United States Patent
Spencer et al.

(10) Patent No.: US 10,074,210 B1
(45) Date of Patent: Sep. 11, 2018

(54) PUNCH-THROUGH TECHNIQUES FOR GRAPHICS PROCESSING

(71) Applicant: Apple Inc., Cupertino, CA (US)

(72) Inventors: Christopher L. Spencer, Chuluota, FL (US); Karl D. Mann, Geneva, FL (US); Ralph C. Taylor, Orlando, FL (US); Dinesh D. Kuwar, Oviedo, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/659,188

(22) Filed: Jul. 25, 2017

(51) Int. Cl.
| | |
|---|---|
| *G06T 15/50* | (2011.01) |
| *G06T 15/60* | (2006.01) |
| *G06T 15/40* | (2011.01) |
| *G06T 15/00* | (2011.01) |
| *G06T 15/08* | (2011.01) |
| *G06T 15/80* | (2011.01) |
| *G06T 17/20* | (2006.01) |
| *G09G 5/00* | (2006.01) |

(52) U.S. Cl.
CPC .......... *G06T 15/40* (2013.01); *G06T 15/005* (2013.01); *G06T 15/08* (2013.01); *G06T 15/80* (2013.01); *G06T 17/20* (2013.01); *G09G 5/00* (2013.01)

(58) Field of Classification Search
None
See application file for complete search history.

(56) References Cited

U.S. PATENT DOCUMENTS

| | | | |
|---|---|---|---|
| 6,898,692 B1 * | 5/2005 | Cameron | G06T 15/405 710/52 |
| 8,446,409 B2 * | 5/2013 | Howson | G06T 15/40 345/419 |
| 8,605,102 B1 | 12/2013 | Purcell et al. | |
| 8,692,848 B2 | 4/2014 | Adams et al. | |
| 2002/0080143 A1 | 6/2002 | Morgan et al. | |
| 2012/0317545 A1 * | 12/2012 | Chandra | G06F 9/451 717/110 |
| 2013/0207977 A1 * | 8/2013 | Howson | G06T 15/40 345/422 |
| 2016/0189681 A1 * | 6/2016 | White | G09G 5/14 345/502 |
| 2016/0379381 A1 | 12/2016 | Krutsch et al. | |

(Continued)

*Primary Examiner* — Martin Mushambo
(74) *Attorney, Agent, or Firm* — Meyertons, Hood, Kivlin, Kowert & Goetzel, P.C.

(57) ABSTRACT

Techniques are disclosed relating to rendering graphics objects that require shader operations to determine visibility. In some embodiments, a graphics unit is configured to process feedback objects, which may require shading to determine whether they are visible relative to previously-processed objects, out of draw order. For example, in embodiments where a buffer is used to store fragment data for deferred rendering, the graphics unit may bypass the buffer and shade feedback objects ahead of earlier non-feedback objects whose fragment data is stored in the buffer. This may allow a determination of whether to remove occluded non-feedback fragment data from the buffer, which may reduce graphics overdraw. In disclosed two-pass techniques, data for feedback objects is first allowed to bypass the buffer for visibility shading, but is then stored in the buffer for a second pass to perform fragment shading to actually determine pixel attributes, which may further reduce overdraw.

20 Claims, 7 Drawing Sheets

(56) References Cited

U.S. PATENT DOCUMENTS

2017/0116702 A1* 4/2017 Viggers .................... G06T 1/20
2017/0161940 A1* 6/2017 Liktor .................... G09G 5/363
2017/0169602 A1* 6/2017 Blackmon ............... G06F 3/013

* cited by examiner

PUNCH-THROUGH TECHNIQUES FOR GRAPHICS PROCESSING

BACKGROUND

Technical Field

This disclosure relates generally to graphics processors and more specifically to techniques for rendering graphics objects that require shading to determine visibility.

Description of the Related Art

Some graphics processors use an on-chip buffer to store visible fragments for objects (which may also be referred to as primitives) that have been rasterized to facilitate deferred rendering. Tile-based deferred rending (TBDR) is one example that uses tile buffers. When subsequent objects are rasterized (e.g., based on a draw order of a graphics program), they may overwrite data for existing objects in the tile buffer. Therefore, at a given point in time, the tile buffer may store fragment data that is currently determined to be visible, but may later be overwritten by subsequent objects before being shaded. Eventually, data from the tile buffer is sent to a programmable shader for shader processing to determine pixel attributes (which may be stored in a color buffer, for example, which may be used to generate a frame buffer of data to be displayed). Using a tile buffer and discarding data for occluded objects may reduce the overall shader processing in a graphics unit. Generally, TBDR techniques may require less dedicated bandwidth in a graphics processor, relative to immediate mode rendering.

Some objects, however, require fragment shading operations to determine their final visibility. These objects may be referred to as feedback objects, and a feedback object which overlaps (e.g., at a pixel or sample granularity) with previous data in the tile buffer may force a flush of part of the tile buffer to the programmable shader and may result in the graphics unit shading more pixels than necessary (which is commonly referred to as "overdraw"). Reducing overdraw typically increases performance and/or reduce power consumption in a graphics unit.

SUMMARY

Techniques are disclosed relating to rendering graphics objects that require shader operations to determine visibility. In some embodiments, a graphics unit is configured to process feedback objects, which may require shading to determine whether they are visible relative to previously-processed objects, out of draw order. For example, in embodiments where a buffer is used to store fragment data for deferred rendering, the graphics unit may bypass the buffer and shade feedback objects ahead of earlier non-feedback objects whose fragment data is stored in the buffer. This may allow a determination of whether to remove occluded non-feedback fragment data from the buffer, which may reduce overdraw, e.g., relative to traditional techniques in which a feedback object would force a flush and shade of data for a prior non-feedback object.

In some embodiments, the bypassed feedback data is used to update a color buffer based on the shading. In some embodiments, a two-pass technique involves allowing data for feedback objects to bypass the buffer for visibility shading, but then storing currently-visible data for the feedback objects in the buffer to wait for a second pass to perform fragment shading and actually determine pixel attributes. In some embodiments, the two-pass techniques may further reduce overdraw, e.g., by allowing objects that follow the feedback object in draw order to occlude fragment data for the feedback object while it is stored in the buffer between the first pass and the second pass.

Figure 1A:
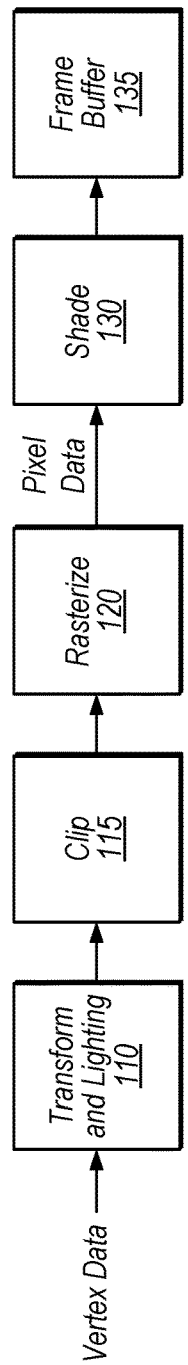
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f)

during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Figure 1B:
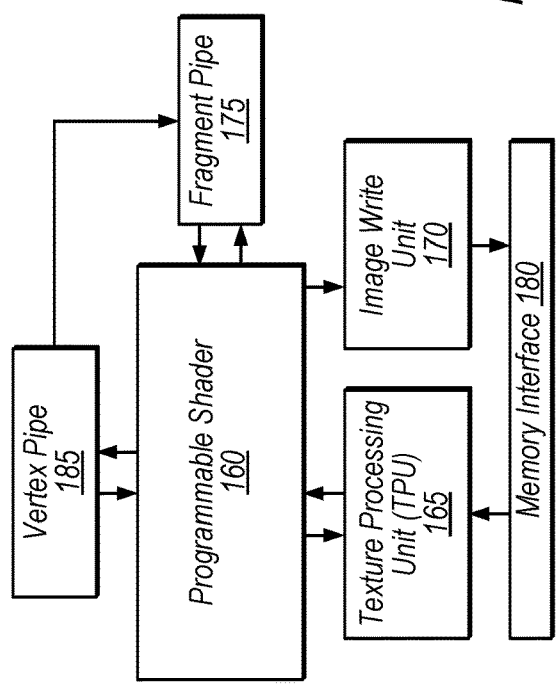
FIG. 1B is a block diagram illustrating one embodiment of a graphics unit.
Figure 2:
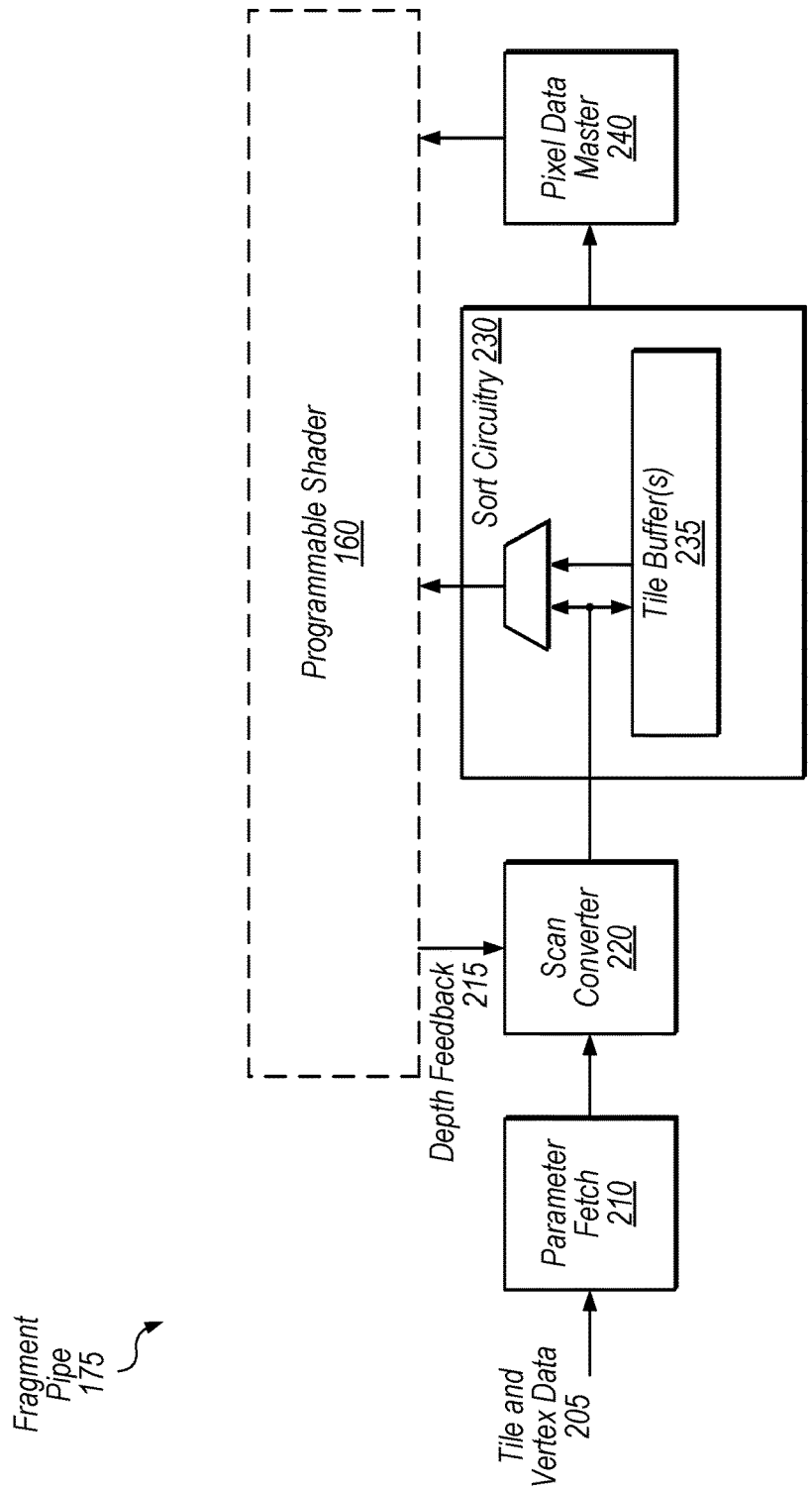
FIG. 2 is a block diagram illustrating an exemplary fragment pipeline, according to some embodiments.
Figure 3:
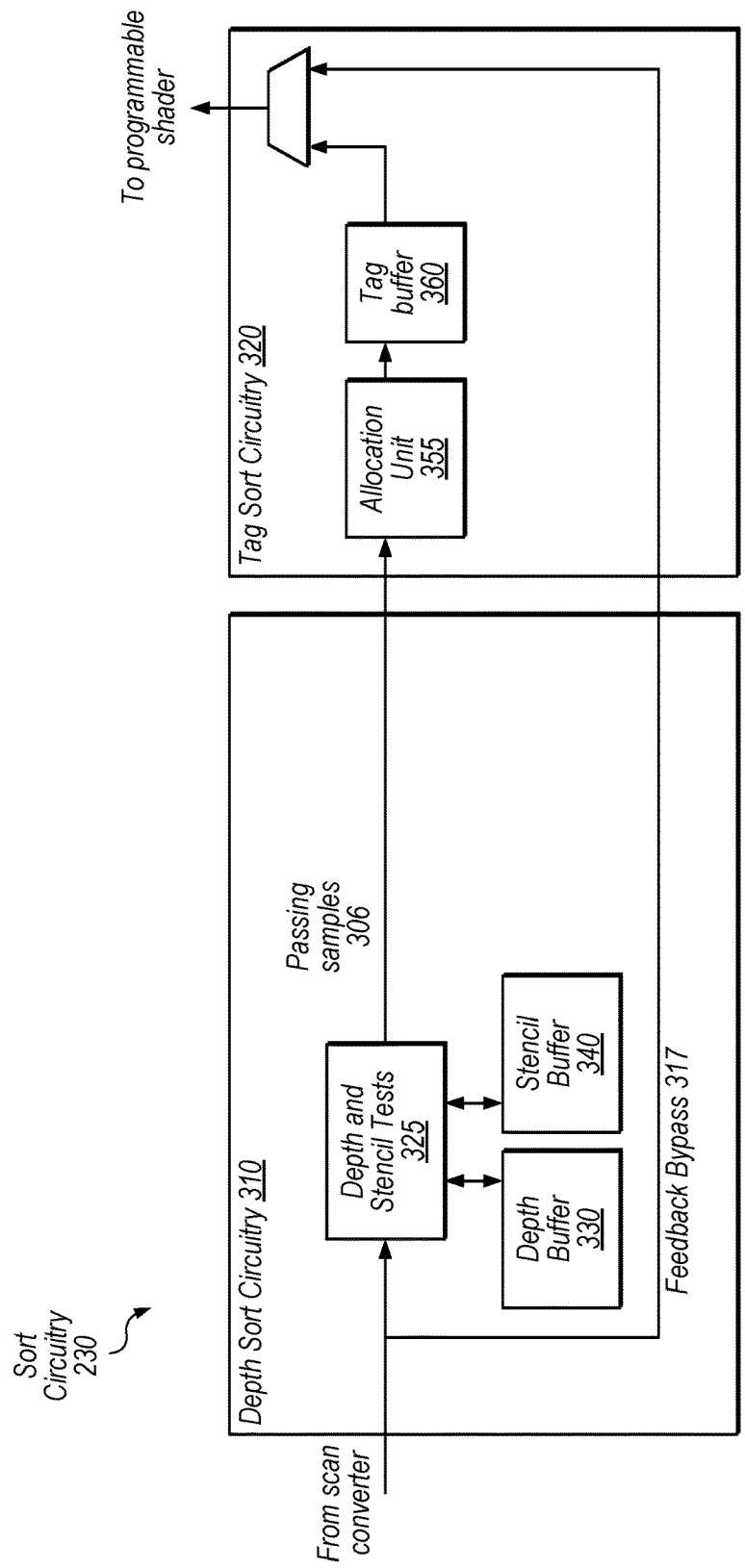
FIG. 3 is a block diagram illustrating an exemplary sort and buffer circuitry for deferred rendering, according to some embodiments.
Figure 4:
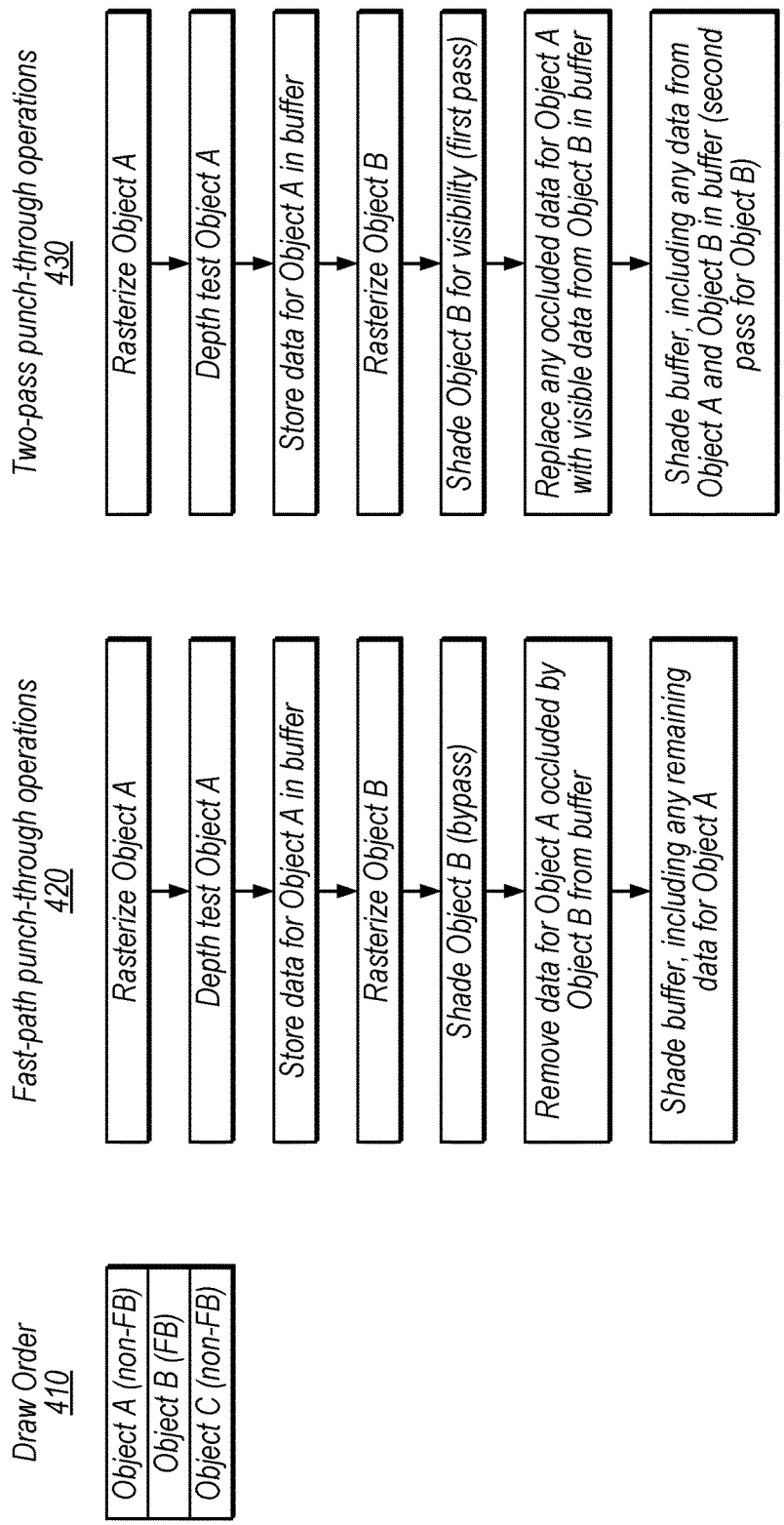
FIG. 4 is a diagram illustrating exemplary processing orders for feedback and non-feedback objects using fast-path and two-pass punch-through techniques, respectively.
Figure 5:
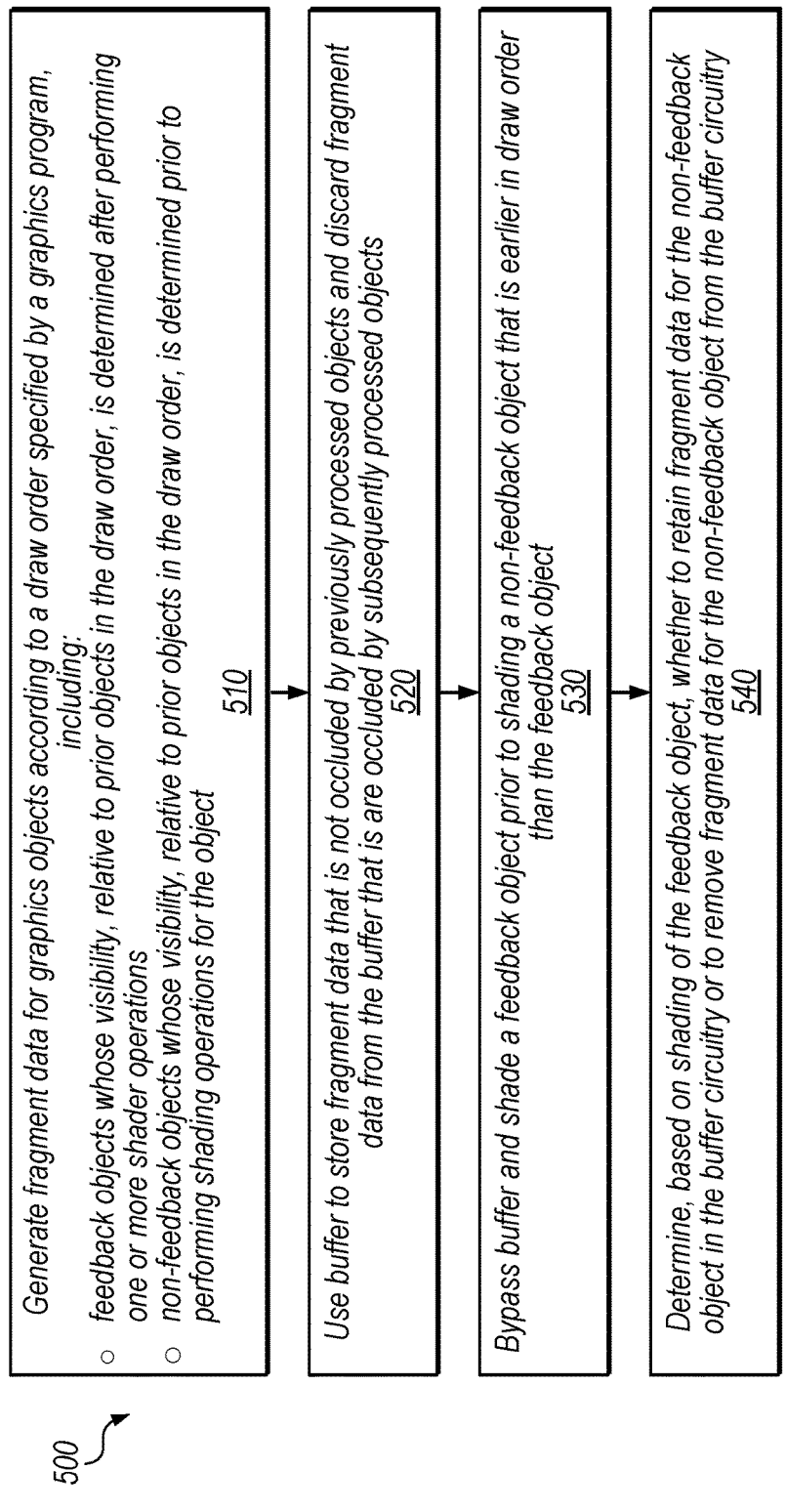
FIG. 5 is a flow diagram illustrating an exemplary method for bypassing a buffer for feedback objects, according to some embodiments.
Figure 6:
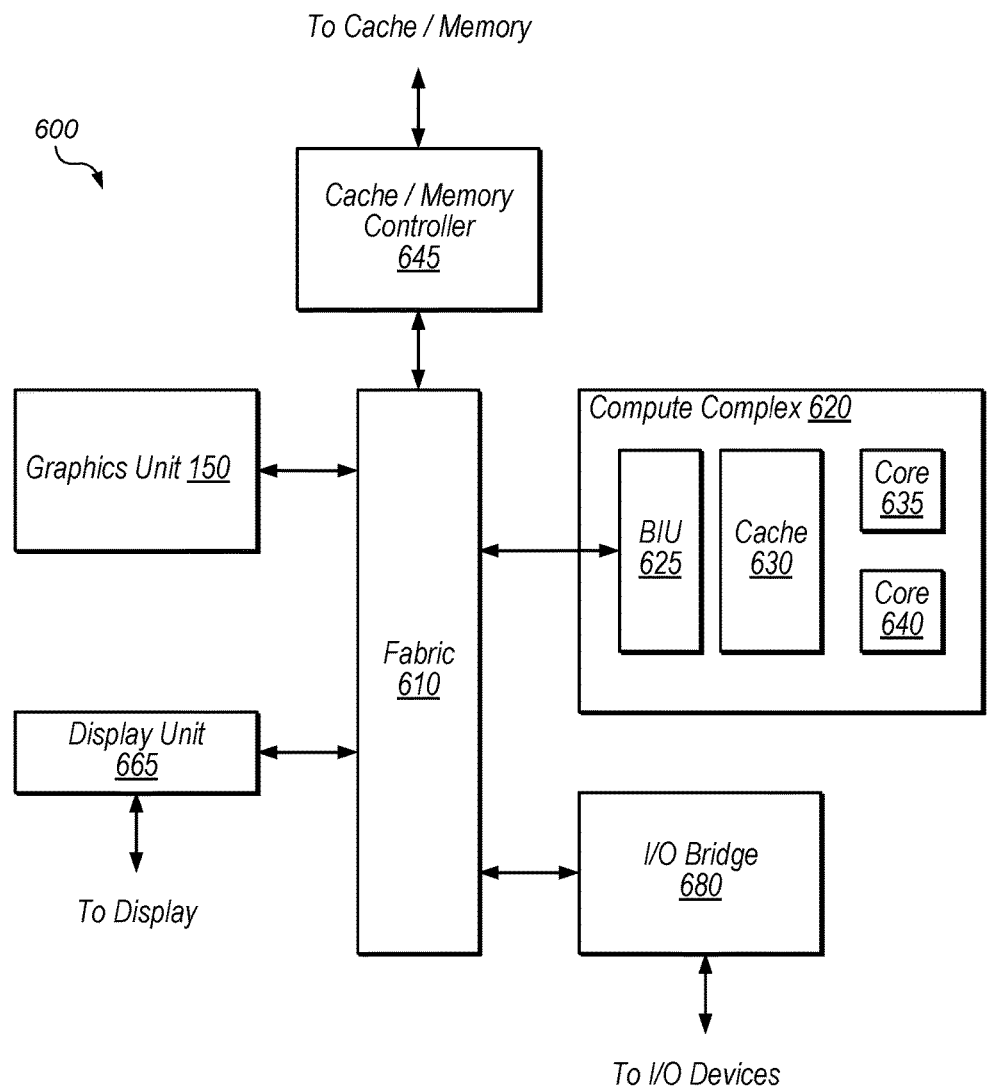
FIG. 6 is a block diagram illustrating one embodiment of a device that includes a graphics unit.
Figure 7:
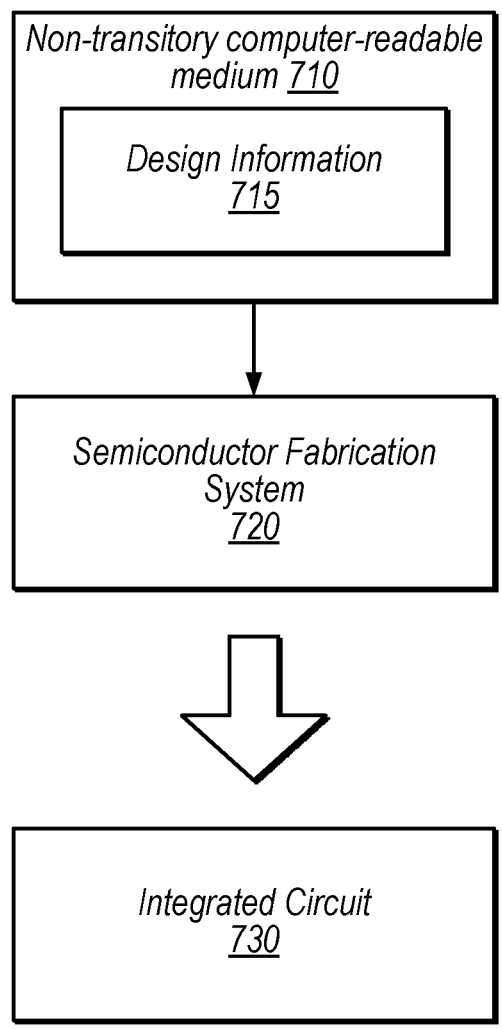
FIG. 7 is a block diagram illustrating an exemplary computer-readable medium, according to some embodiments.

This disclosure initially describes, with reference to FIGS. 1A-1B, a generalized overview of a graphics processing flow and an exemplary graphics unit. FIGS. 2-3 illustrate exemplary implementations of a fragment pipeline and occlusion circuitry for deferred rendering. FIG. 4 shows exemplary orderings for two techniques for allowing feedback graphics objects to bypass a buffer in order to shade those objects out of draw order. FIG. 5 illustrates an exemplary method, FIG. 6 illustrates an exemplary device, and FIG. 7 illustrates an exemplary computer-readable medium. In various embodiments, the disclosed techniques may reduce graphics overdraw during rendering, which may in turn improve performance and/or reduce power consumption.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, memory interface 180, and texture state cache 190. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Fragment Pipe Overview

FIG. 2 is a block diagram illustrating an exemplary fragment pipe 175, according to some embodiments. In the illustrated embodiment, fragment pipe 175 includes parameter fetch circuitry 210, scan converter 220, sort circuitry 230, and pixel data master 240. In the illustrated embodiment, various elements of fragment pipe 175 are configured to communicate with programmable shader 160.

Parameter fetch circuitry 210, in the illustrated embodiment, is configured to receive tile and vertex data 205 for the current tile being processed. This may be obtained via one or more elements of a graphics memory hierarchy, for example, which may contain various cache levels, shared memory structures, etc. The vertex data may specify coordinates of vertices for each primitive in a list of primitives that intersects with the tile being processed. Data 205 may also contain various information associated vertex information with the tile being processed and/or describing the tile being processed. As used herein the terms "primitive" and "object" are used interchangeably in the graphics context and refer to simple geometric objects that a graphics unit is configured to handle, e.g., lines, triangles, other types of polygons, curves, etc.

Scan converter 220, in the illustrated embodiment, is configured to perform rasterization to generate fragment data based on the vertex data. The term "fragment" is intended to be construed according to its well-understood meaning and fragment data may specify data needed to shade a pixel based on a given primitive (e.g., a reference to one or more shader programs to be executed by programmable shader 160 for the fragment, coordinates for the fragment, etc.), plus data needed to test whether the fragment survives to contribute to attributes of a corresponding pixel (depth, alpha, stencil, scissor, window ID, etc.). In some rendering modes, fragment data may include data for multiple samples per fragment/pixel. The fragment data may be specified at one or more of various levels of granularity (e.g., fragment data may be stored per-sample or may be aggregated per-fragment, per-object, per-tile, etc.).

Sort circuitry 230, in the illustrated embodiment, includes one or more tile buffer(s) 235 and is configured to determine to track which fragments are currently visible until they are shaded. For example, data for a fragment that is covered by an opaque object that is nearer to the screen in a scene being rendered may be discarded from a tile buffer 235 because it is determined not to be visible. These occlusion techniques may reduce the processing required by programmable shader 160, in various embodiments. In some embodiments, sort circuitry 230 includes a separate tile buffer for each tile being processed, which may allow rendering of multiple tiles in parallel. Further, multiple instances of fragment pipe 175 may be included in a given graphics unit, further increasing resources for parallel processing.

In some embodiments, sort circuitry 230 is configured to receive fragment data for objects according to a draw order specified in a graphics program. In some embodiments, sort circuitry 230 is configured to shade fragments for objects in a different order than the draw order, as discussed in further detail below with reference to FIG. 3. For example, in some embodiments sort circuitry 230 is configured to use the illustrated multiplexer (MUX) to bypass tile buffer(s) 235 and at least partially shade certain types of fragments prior to (or without) storing them in tile buffer(s) 235.

In the illustrated embodiment, programmable shader 160 is configured to send depth feedback information 215 to scan converter 220 based on shading fragment data. In other embodiments, programmable shader 160 may provide depth feedback 215 directly to sort circuitry 230. This feedback information may indicate the depth of shaded feedback objects, which may be used to determine whether data in a tile buffer 235 is occluded. In some embodiments, this feedback information 215 may include data for a feedback object for placement in a tile buffer 235 for further shading (e.g., after a first pass of a two-pass technique, as discussed in further detail below). Once shading of a feedback object to determine depth is complete, sort circuitry 230 may be configured to discard any occluded data from tile buffer(s) 235.

As used herein, "occlusion" of fragment data refers to a situation where it is determined that the fragment data will not actually contribute to pixel attributes in a frame of graphics data. For example, occlusion occurs when the fragment data is for an object that is behind another object in the scene being rendered and the other object is opaque.

Pixel data master 240, in the illustrated embodiment, is configured to send shader work to programmable shader 160, e.g., in order to shade contents of tile buffer(s) 235. Pixel data master 240 may be configured to flush all or a portion of the contents of a tile buffer 235 for shading, in some embodiments, in response to various events. In some embodiments, graphics unit 150 includes multiple data masters, which may include a vertex data master configured to send vertex work to programmable shader 160 and a compute data master configured to send compute work to programmable shader 160. In some embodiments, programmable shader 160 includes scheduling circuitry configured to allocate hardware resource in programmable shader 160 for work from the various data masters.

Overview of Feedback Objects

As discussed above, "feedback" objects may require shading before sort circuitry 230 can determine whether fragments for the feedback objects are currently visible or are occluded by previously-processed objects. In contrast, opaque objects are one example of a "non-feedback" object type whose current visibility (relative to other previous objects whose depths are known) can be determined without shading. As used herein, the terms "feedback object" and "punch-through object" are used interchangeably.

In some embodiments, "fast-path" techniques allow feedback objects to be shaded out of draw order, e.g., to bypass a tile buffer 235 using path 217 and be shaded before an overlapping object that is earlier in the draw order. Said another way, sort circuitry 230 may not store feedback objects in a buffer for deferred rendering, but may shade these objects immediately. In this manner, shading for feedback objects may allow updating of a depth buffer used to determine whether other objects are visible. This may reduce overdraw, in which shading is performed to generate fragment data that is not actually used for final pixel attributes, relative to non-fast-path techniques. For example, in non-fast-path techniques, non-feedback data in a tile buffer may be flushed to programmable shader 160 for shading, followed by sending feedback data to programmable shader 160 for shading, even though shading for only the feedback or non-feedback data may actually be needed in the presence of occlusion. Further, in some embodiments, at least a portion of shaders for certain feedback objects cannot be occluded, so deferred rendering may not be helpful for these types of feedback objects. In fast-path techniques, the feedback results may punch through the non-feedback data in a tile buffer 235, allowing data for the non-feedback object to be removed from the buffer without requiring shading, while the results of shading feedback objects may be used to update a color buffer.

In some embodiments, discussed in further detail below, shader programs for feedback objects are split into two parts: a visibility shader and a fragment shader. Programmable shader 160 may process these two parts separately, e.g., by performing the visibility shader via a bypass path and later performing the fragment shader after storing data in a tile buffer 235. These techniques may be referred to as "two-pass" punch-through. Two-pass punch-through may have the benefits of fast-past punch-through and may further reduce overdraw. For example, while data for a feedback object is waiting in a buffer 235 for its second pass (after the visibility portion of the shader has been performed), subsequent objects may occlude the data in the buffer, which allows removal of the data to prevent overdraw shading (where this data may have been unnecessarily shaded when using single-pass fast-path punch-through techniques). Thus, two-pass techniques may allow rapid determination of visibility while still providing benefits of deferred rendering for feedback objects.

Exemplary Sort Circuitry

FIG. 3 is a block diagram illustrating exemplary elements of sort circuitry 230, according to some embodiments. In the illustrated embodiment, sort circuitry 230 includes depth sort circuitry 310 and tag sort circuitry 320. In other embodiments, functionality described herein as performed by elements 310 and 320 may be performed by combined circuitry. The disclosed circuitry of FIGS. 2-3 is provided for purposes of illustration, but is not intended to limit the scope of the present disclosure. In other embodiments, elements may be combined or omitted and additional elements may be incorporated.

Depth sort circuitry 310, in the illustrated embodiment, includes depth and stencil test circuitry 324, depth buffer 330, and stencil buffer 340.

Depth and stencil test circuitry 325, in some embodiments, is configured to receive rasterized depth values (which may be referred to as z-values) and coordinates for each processed sample from scan converter 220. Circuitry 325 may be configured to perform various tests to determine if fragment data should be shaded, e.g., by comparing the depth of received samples to previously-received samples at the same coordinates (e.g., as maintained in depth buffer 330, which may be configured to store an indication of the nearest-in-screen-space previously-received sample at each coordinate). Similarly, circuitry 325 may be configured to compare the coordinates of incoming samples to values in stencil buffer 340 to limit the area of rendering. In the illustrated embodiment, passing samples 306 are samples that survive the tests of circuitry 325 and should be shaded based on currently-known data (although they may be occluded by subsequent objects).

In some embodiments, depth sort circuitry 310 includes multiple instances of circuitry 325 in order to process data from scan converter 220 in parallel (e.g., for different tiles being processed). In some embodiments, depth sort circuitry 310 includes a separate depth buffer and stencil buffer for each tile currently being processed.

In the illustrated embodiment, depth sort circuitry 310 is configured to send data from scan converter 220 for feedback objects directly to tag sort circuitry 320 without performing depth and stencil tests. This may allow feedback data to be sent to programmable shader 160 out of draw order, relative to non-feedback data. This may facilitate the fast-path and two-pass punch-through techniques discussed above. Therefore, scan converter 220 may be configured to provide signaling to sort circuitry 230 that indicates which data is for feedback objects.

Tag sort circuitry 320, in the illustrated embodiment, includes allocation unit 355 and tag buffer 360. Allocation unit 355, in some embodiments, is configured to handle discarding of old data in tag buffer 360 when occluded by new passing samples 306. Tag buffer 360, in some embodiments, is a tile buffer configured to store fragment data until it is shaded or replaced. Therefore, tag buffer 360 may store data that is currently determined to be visible, but may be occluded before it is shaded. In the illustrated embodiment, tag sort circuitry 320 includes a MUX configured to select between data from feedback bypass 317 and tag buffer 360 to send to programmable shader 160 for shading. This may allow this fragment data to be transmitted using the same interface. In other embodiments, separate interfaces may be used for feedback and non-feedback data.

In various embodiments, tag buffer 360 is configured to store fragment data. Tag buffer 360 may be configured to aggregate certain information for fragments and/or samples. Any of various encodings for fragments and/or samples may be used to store data in tag buffer 360.

In two-pass embodiments, tag buffer 360 may be configured to store fragment data between the first and second passes. After the first pass via feedback bypass 317, fragment data for feedback objects may be processed by circuitry 325, before being stored in tag buffer 360. Programmable shader 160 may subsequently perform the second pass for surviving fragment data for feedback objects in tag buffer 360.

Fast-Path and Two-Pass Punch-Through Ordering Examples

FIG. 4 is a diagram illustrating exemplary processing steps for different punch-through techniques. In the illustrated embodiment, a draw order 410 starts with object A (a non-feedback object), followed by object B (a feedback objects), which is in turn followed by object C (another non-feedback object). As discussed above, fragment pipe 175 is configured to shade feedback and non-feedback objects out of draw order, in some embodiments.

Operations 420 set out an exemplary ordering for shading objects A-C using fast-path punch-through. In the illustrated example, scan converter 220 rasterizes object A, then depth sort circuitry 310 performs a depth test on object A, then tag sort circuitry 320 stores passing data for object A in tag buffer 360. In the illustrated example, scan converter 220 then rasterizes object B, then depth sort circuitry 310 proceeds to send object B for shading using bypass 317. Note that this shading may be performed before or after data for object A has been stored in tag buffer 360, but, in various embodiments, it is performed before fragment data for object A has been shaded at all.

In the illustrated example, tag sort circuitry 320 then removes any data for object A that has been occluded (based on shading of object B) from tag buffer 360. For example, programmable shader 160 may indicate to scan converter 220 and/or sort circuitry 230 which data should be removed or may indicate depth information from the shading of object B, which may be used to determine what data for object A is occluded.

Subsequently, in the illustrated example, programmable shader 160 shades contents of tag buffer 360, including any remaining data for object A in tag buffer 360. Note that, in this example, object B data may already have updated a color buffer based on its shading without ever being stored in tag buffer 360 and the shading for object A may also update the color buffer (in contrast, for two-pass punch-through, data for object B may be stored in tag buffer 360).

Operations 430 set out an exemplary order for shading objects A-C using two-pass punch-through. In the illustrated example, scan converter 220 rasterizes object A, then depth sort circuitry 310 performs a depth test on object A, then tag sort circuitry 320 stores passing data for object A in tag buffer 360. In the illustrated example, scan converter 220 then rasterizes object B, then depth sort circuitry 310 proceeds to send object B for shading using bypass 317.

For two-pass punch-through embodiments, fragment pipeline 175 is configured to separate a shader program for feedback objects into two portions, a first portion which is sufficient to determine visibility and a second portion that specifies additional fragment shading. At this point, in the illustrated example, object B is shaded for visibility, using the first portion of the shader program (the first shader pass).

In the illustrated example, depth sort circuitry 310 then receives data indicating results of the visibility shading from programmable shader 160, circuitry 325 performs one or more tests on the results, and passing samples for object B are stored in tag buffer 360 (causing removal of any occluded data for object A that was in tag buffer 360).

In the illustrated example, programmable shader 160 then shades data from tag buffer 360 at a subsequent time, including any remaining data for object A and object B. This shading is the second shader pass of two-pass punch-through for object B, in this example.

Note that both examples 420 and 430 may avoid overdraw of samples for object A that are occluded by object B. Further, example 430 may avoid overdraw of samples for object B that are occluded by any subsequent objects while the data for object B is in tag buffer 360.

Exemplary Method

FIG. 5 is a flow diagram illustrating an exemplary method 500 for bypassing, for feedback objects, a buffer that stores graphics data for deferred rendering, according to some embodiments. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, raster circuitry (e.g., scan converter 220) generates fragment data for graphics objects according to a draw order specified by a graphics program. In some embodiments, the fragment data is specified at per-sample granularity. In the illustrated embodiment, the raster circuitry generates fragment data for both feedback objects (whose visibility, relative to prior objects in the draw order, is determined after performing one or more shader operations) and non-feedback objects (whose visibility, relative to prior objects in the draw order, is determined prior to performing any shading operations for the object). The fragment data may include coordinates, depth information, pointers to shader code, draw state, etc.

At 520, in the illustrated embodiment, a buffer (e.g., tag buffer 360 or tile buffer 235) stores fragment data that is not occluded by previously processed objects. In the illustrated embodiment, the graphics unit discards fragment data from the buffer that is occluded by subsequently processed objects. This buffering may be performed on a per-tile basis and may be used to enable deferred rendering. Speaking generally, the buffering may attempt to aggregate as much fragment data and detect as much occlusion as possible, prior to shading, to reduce overdraw.

At 530, in the illustrated embodiment, sort circuitry bypasses the buffer and shades a feedback object prior to shading a non-feedback object that is earlier in draw order than the feedback object. In some embodiments, such as fast-path embodiments, the shading may update the color buffer. In two-pass embodiments, the shading may be used to determine visibility and visible fragment data may be stored in the tile buffer.

At 540, in the illustrated embodiment, sort circuitry determines, based on shading of the feedback object, whether to retain fragment data for the non-feedback object in the buffer circuitry or to remove fragment data for the non-feedback object from the buffer circuitry. This operation may be performed at sample granularity. For two-pass techniques, occluding data from the feedback object may be placed in the buffer circuitry when data for the non-feedback object is removed, and may be subsequently shaded. For other techniques, the shading for the feedback object may be used to update pixel attributes in a color buffer and data for the feedback object may never be stored in the buffer. In some embodiments, scheduling circuitry such as pixel data master 240 is configured to determine when to flush fragment data from the buffer circuitry for shading.

As discussed above, in two-pass techniques the graphics unit may be configured to split a shader program for the feedback object into a first set of shader instructions to determine visibility for the feedback object and a second set of shader instructions to determine pixel attributes for the feedback object. Further, the graphics unit may be configured to bypass the buffer circuitry for the first set of instructions (e.g., to quickly determine visibility) and store fragment data determined to be currently visible based on the first set of shader instructions in the buffer for subsequent processing using the second set of shader instructions.

In some embodiments, the graphics unit is configured to perform tile-based deferred rendering and the buffer circuitry is configured to store fragment data that is not currently occluded for a tile being processed. Thus, data in the buffer may be determined not be occluded by previously-processed objects, but may be later occluded by subsequently-processed objects before shading. As discussed above, determining visibility may be split between depth sort and tag sort circuitry, on some embodiments. Further, the graphics unit may include multiple different depth buffers, stencil buffers, and/or tag buffers for processing multiple tiles in parallel.

Exemplary Device

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 680, and display unit 665. In some embodiments, device 600 may include other components (not shown) in addition to and/or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

In some embodiments, various elements of device 600 may include clock gaters arranged hierarchically, including various series of DET clock gaters coupled to deliver clock signals to different portions of a clock tree. The disclosed techniques may reduce switching power consumption in device 600, balance the clock delay to different portions of device 600, reduce errors in device 600, achieve higher frequency, achieve required frequency at a lower power supply voltage, reduce energy dissipated per cycle (or per task, per pixel, or per byte, for example), etc.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabrication at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1B, 2, and/or 3. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 raster circuitry configured to generate fragment data for graphics objects according to a draw order specified by a graphics program, including:
  feedback objects whose visibility, relative to prior objects in the draw order, the apparatus is configured to determine after performing one or more shader operations; and
  non-feedback objects whose visibility, relative to prior objects in the draw order, the apparatus is configured to determine prior to performing shading operations for the object;
 buffer circuitry configured to store fragment data that is not occluded by previously processed objects, wherein the apparatus is configured to discard fragment data from the buffer circuitry that is occluded by subsequently processed objects;
 a shader processing element configured to perform fragment shading based on the fragment data stored in the buffer circuitry;
 wherein the apparatus is configured to:
  bypass the buffer circuitry and shade, using the shader processing element, a feedback object prior to shading a non-feedback object that is earlier in draw order than the feedback object; and
  determine, based on shading of the feedback object, whether to retain fragment data for the non-feedback object in the buffer circuitry or to remove fragment data for the non-feedback object from the buffer circuitry.

2. The apparatus of claim 1,
 wherein the apparatus is configured to split a shader program for the feedback object into a first set of shader instructions to determine visibility for the feedback object and a second set of shader instructions to determine pixel attributes for the feedback object; and
 wherein the apparatus is configured to bypass the buffer circuitry for the first set of instructions and store fragment data determined to be currently visible based on the first set of shader instructions in the buffer circuitry for subsequent processing using the second set of shader instructions.

3. The apparatus of claim 2, wherein the apparatus is configured to remove a portion of fragment data for the feedback object from the buffer circuitry in response to occlusion of the fragment data by a subsequently-processed object, prior to performing the second set of shader instructions for the portion of fragment data for the feedback object.

4. The apparatus of claim 1, wherein the apparatus is configured to perform tile-based deferred rendering and wherein the buffer circuitry is configured to store fragment data that is not currently occluded for a tile being processed.

5. The apparatus of claim 1, further comprising:
 depth sort circuitry configured to determine whether fragment data is currently visible based on a depth buffer and a stencil buffer; and
 tag sort circuitry configured to store fragment data from the depth sort circuitry using tags for each sample, wherein the tags identify corresponding primitive and draw state information.

6. The apparatus of claim 1, further comprising separate buffer circuitry that the apparatus is configured to use to process multiple tiles in a screen space in parallel.

7. The apparatus of claim 1, wherein the apparatus is configured to subsequently perform shading to determine pixel attributes for retained fragment data of the non-feedback object.

8. The apparatus of claim 1, further comprising:

pixel scheduling circuitry configured to flush data from the buffer circuitry to the shader processing element for shading.

9. A method, comprising:
generating, by raster circuitry, fragment data for graphics objects according to a draw order specified by a graphics program, including:
feedback objects whose visibility, relative to prior objects in the draw order, is determined after performing one or more shader operations; and
non-feedback objects whose visibility, relative to prior objects in the draw order, is determined prior to performing shading operations for the object;
storing, by buffer circuitry, fragment data that is not occluded by previously processed objects and discarding fragment data from the buffer circuitry that is occluded by subsequently processed objects;
bypassing the buffer circuitry and shading, using a shader processing element, a feedback object prior to shading a non-feedback object that is earlier in draw order than the feedback object; and
determining, based on shading of the feedback object, whether to retain fragment data for the non-feedback object in the buffer circuitry or to remove fragment data for the non-feedback object from the buffer circuitry.

10. The method of claim 9, further comprising:
splitting a shader program for the feedback object into a first set of shader instructions to determine visibility for the feedback object and a second set of shader instructions to determine pixel attributes for the feedback object; and
bypassing the buffer circuitry for the first set of instructions and storing fragment data determined to be currently visible based on the first set of shader instructions in the buffer circuitry for subsequent processing using the second set of shader instructions.

11. The method of claim 10, further comprising removing a portion of fragment data for the feedback object from the buffer circuitry in response to occlusion of the fragment data by a subsequently-processed object, prior to performing the second set of shader instructions for the portion of fragment data for the feedback object.

12. The method of claim 9, further comprising:
using depth sort circuitry to determine whether fragment data is currently visible based on a depth buffer and a stencil buffer; and
using tag sort circuitry to store fragment data from the depth sort circuitry using tags for each sample, wherein the tags identify corresponding primitive and draw state information.

13. The method of claim 9, further comprising:
subsequently perform shading to determine pixel attributes for retained fragment data of the non-feedback object in the buffer circuitry.

14. A non-transitory computer readable storage medium having stored thereon design information that specifies a design of at least a portion of a hardware integrated circuit in a format recognized by a semiconductor fabrication system that is configured to use the design information to produce the circuit according to the design, including:
raster circuitry configured to generate fragment data for graphics objects according to a draw order specified by a graphics program, including:
feedback objects whose visibility, relative to prior objects in the draw order, the circuit is configured to determine after performing one or more shader operations; and
non-feedback objects whose visibility, relative to prior objects in the draw order, the circuit is configured to determine prior to performing shading operations for the object;
buffer circuitry configured to store fragment data that is not occluded by previously processed objects, wherein the circuit is configured to discard fragment data from the buffer circuitry that is occluded by subsequently processed objects;
a shader processing element configured to perform fragment shading based on the fragment data stored in the buffer circuitry;
wherein the circuit is configured to:
bypass the buffer circuitry and shade, using the shader processing element, a feedback object prior to shading a non-feedback object that is earlier in draw order than the feedback object; and
determine, based on shading of the feedback object, whether to retain fragment data for the non-feedback object in the buffer circuitry or to remove fragment data for the non-feedback object from the buffer circuitry.

15. The non-transitory computer readable storage medium of claim 14,
wherein the circuit is configured to split a shader program for the feedback object into a first set of shader instructions to determine visibility for the feedback object and a second set of shader instructions to determine pixel attributes for the feedback object; and
wherein the circuit is configured to bypass the buffer circuitry for the first set of instructions and store fragment data determined to be currently visible based on the first set of shader instructions in the buffer circuitry for subsequent processing using the second set of shader instructions.

16. The non-transitory computer readable storage medium of claim 15, wherein the circuit is configured to remove a portion of fragment data for the feedback object from the buffer circuitry in response to occlusion of the fragment data by a subsequently-processed object, prior to performing the second set of shader instructions for the portion of fragment data for the feedback object.

17. The non-transitory computer readable storage medium of claim 14, wherein the design information specifies that the circuit further comprises:
depth sort circuitry configured to determine whether fragment data is currently visible based on a depth buffer and a stencil buffer; and
tag sort circuitry configured to store fragment data from the depth sort circuitry using tags for each sample, wherein the tags identify corresponding primitive and draw state information.

18. The non-transitory computer readable storage medium of claim 14, wherein the design information specifies that the circuit further comprises separate buffer circuitry that the circuit is configured to use to process multiple tiles in a screen space in parallel.

19. The non-transitory computer readable storage medium of claim 14, wherein the circuit is configured to subsequently perform shading to determine pixel attributes for retained fragment data of the non-feedback object.

20. The non-transitory computer readable storage medium of claim 14, wherein the design information specifies that the circuit further comprises pixel scheduling circuitry configured to flush data from the buffer circuitry to the shader processing element for shading.

\* \* \* \* \*